No. 782,947.  Patented February 21, 1905.

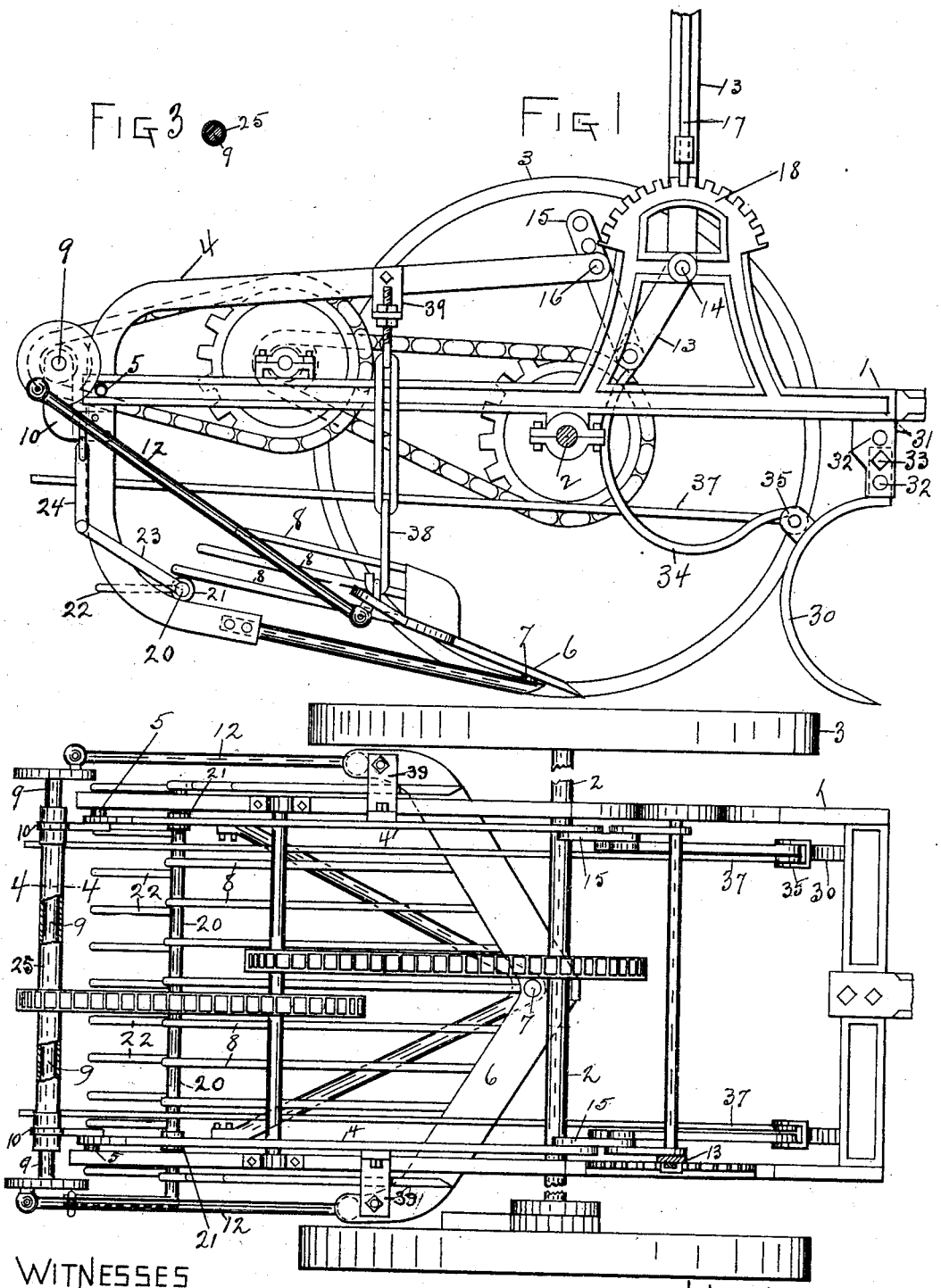

UNITED STATES PATENT OFFICE.

JAMES A. BUCK, OF CRESCENT, NEW YORK, ASSIGNOR TO EXCELSIOR MACHINE COMPANY, OF COHOES, NEW YORK.

POTATO-DIGGER.

SPECIFICATION forming part of Letters Patent No. 782,947, dated February 21, 1905.

Application filed May 13, 1901. Serial No. 59,964.

*To all whom it may concern:*

Be it known that I, JAMES A. BUCK, a citizen of the United States, residing at Crescent, county of Saratoga, and State of New York, have invented certain new and useful Improvements in Potato-Diggers, of which the following is a specification.

The invention relates to such improvements; and it consists of the novel construction and combination of parts hereinafter described and subsequently claimed.

Reference may be had to the accompanying drawings, and the reference characters marked thereon, which form a part of this specification.

Similar characters refer to similar parts in the several figures.

Figure 1 of the drawings is a side elevation of my improved potato-digger with a portion of the tongue and operating-lever broken away. Fig. 2 is a top plan view of the same with portions of the main axle broken away to bring the wheels nearer together for convenience of illustration. Fig. 3 is a vertical cross-section of the crank-shaft and its inclosure, taken on the broken line 4 4 in Fig. 2.

My present invention is an improvement upon the construction shown and described in United States Letters Patent No. 602,497, issued to James A. Buck and another April 19, 1898, for improvements in potato-diggers, to which patent reference may be had for a more complete description.

In embodying my present invention I make use of a sulky-truck having a frame 1, supported by the axle 2 and wheels 3. The curved beam 4 is pivoted at 5 upon the truck-frame 1 and supports at its lower end the plow 6, which is oscillatory upon the vertical pivot 7. The wings of the plow are provided with a plurality of tines 8, projecting rearwardly from the wings of the plow. The oscillatory movements are communicated to the plow upon its vertical axis by means of connections with the traction-wheels 3, consisting of the sprocket wheels and chains connecting the main axle with the crank-shaft 9, rotary in suitable bearings formed in the bracket 10, riveted to the plow-beam. This crank-shaft is connected, by means of the pitmen 12, with the respective wings of the plow. Means are provided for oscillating the plow-beam upon its pivot to raise and lower the plow consisting of the hand-lever 13, (shown partly broken away,) pivoted at 14 upon the sulky-frame and adjustably connected by a link 15 with the plow-beam. These parts are held in any desired position by means of the stop 17, engageable with the toothed sector 18 in the usual well-known manner.

The parts thus far described are substantially the same as those shown in said Patent No. 602,497, and for that reason it is not considered necessary to describe the same more in detail.

One of the objects of my present improvement is to leave the potatoes which have been thrown out by the plow of the digger fully exposed on the top of the soil. I accomplish this result by means of a mechanism placed just below and back of the rearwardly-projecting ends of the plow-tines 8. This mechanism consists of a rock-shaft 20, rotary in suitable bearings 21, secured to the lower arm of the plow-beam. This shaft is provided with a plurality of tines 22, projecting rearwardly from the shaft. The shaft extends transversely of the plow and its projecting tines in a horizontal position, so that when rocking movements are imparted to it its tines 22 will oscillate in vertical planes. A rocking movement is imparted to the shaft by means of the arm 23, fixed thereon, and the link 24, pivotally connecting such arm with one of the pitmen 12, as seen in Fig. 1. From an inspection of this figure it will be seen that the movement of the pitman-rod as it follows the wrist-pin on the disk of the crank-shaft 9 will impart a rocking movement to the shaft 20 sufficient to oscillate the tines 22 in vertical planes. The location of these tines 22 just below and back of the plow-tines 8 causes the soil and potatoes which are delivered from the plow and the plow-tines to pass on to the tines 22, and the vertical movements of these tines force the potatoes to the top of the soil, the soil itself being allowed to sift down through between the tines, so that the potatoes are left in a conspicuous position on the top of the soil as they pass from the tines, and it is impossible for any of the potatoes forced up by the plow to remain concealed beneath the soil, as the tines are sufficiently near together to prevent the passage between the same of any potatoes of sufficient size to be of any value.

The crank-shaft 9 is rotated at a considerable speed, and if the weeds or potato-vines should come in contact therewith they might wind around the same in such quantities at the bearings as to prevent the free rotation of the same and cause unnecessary wear upon the journals and bearings. To prevent the possibility of such winding of the weeds, I place the crank-shaft in the inclosure, consisting of a cylindrical shell 25, which prevents the weeds and vines from coming in contact with the shaft.

Another object of my invention is to provide a spring-controlled hook for straightening up and removing weeds and vines in advance of the plow, which hook can be swung up to a higher level at the same time and by the same means employed to raise the plow when the same is not in use. I have shown such a hook 30 pivoted to a bracket 31, depending from the truck-frame. The bracket may be in the form of ears to receive the shank of the hook between them. These ears may be provided with a series of pivot-apertures 32, each adapted to receive the pivotal bolt 33, whereby the hook may be adjusted vertically. The hook while in use is maintained in a yielding position with its forward point at or near the surface of the ground by means of a bow-spring 34, pivoted at one end to ears 35, projecting from the body part of the hook intermediately of its ends, and the other end secured to the lower end of the hand-lever 13. When the plow is locked in position for use by means of the hand-lever with its stop 17 and the toothed sector 18, the spring 34 will maintain the hook 30 in a yielding fixed relation to the plow. The yielding capacity of the hook when acted upon by the weeds will depend upon the strength of the spring 34. It is obvious also that when the plow is lifted by means of the hand-lever connected with the plow-beam the hook 30 will also be lifted, being directly connected, through the spring 34, with the lower end of the hand-lever. A single movement of the hand-lever will thus raise both the plow and the hook from the ground, so that the potato-digger can be freely transported from one field to another without danger of the plow or hook coming in contact with the ground. The ears 35 on the hook also serve to support the rearwardly-projecting bars 37, which extend to the rear end of the machine and tend to prevent the weeds from getting into the traction-wheels or other operating mechanism, the oscillatory movements of the hooks causing vibratory movements of the bars.

Links 38 connect the wings of the plow with the upper part of the plow-beam, being adjustably secured at their upper ends to the bracket 39, bolted to the beam, for the purpose of assisting in the support of the plow, as fully described in said Patent No. 602,497.

What I claim as new, and desire to secure by Letters Patent, is—

In a potato-digger, the combination with a truck and plow-beam; of a plow pivotally supported by the beam; gear mechanism for oscillating the plow; a spring-controlled clearing-hook pivotally supported by the truck-frame; a clearing-bar pivotally connected at one end to an oscillatory part of the hook and extending longitudinally of the truck-frame past the gear mechanism to protect the same from weeds by their shaking movements and movably supported at its other end by the truck-frame, substantially as described.

In testimony whereof I have hereunto set my hand this 25th day of April, 1901.

JAMES A. BUCK.

Witnesses:
FRANK C. CURTIS,
E. M. O'REILLY.